(12) United States Patent
Milanova et al.

(10) Patent No.: US 6,992,173 B2
(45) Date of Patent: Jan. 31, 2006

(54) PROTEIN EXTRACTION FROM CANOLA OIL SEED MEAL

(75) Inventors: Radka Milanova, Vancouver (CA); E. Donald Murray, Eden Mills (CA); Paul S. Westdal, Winnipeg (CA)

(73) Assignee: Burcon Nutrascience (MB) Corp., Winnipeg ( * ) Notice: Subject to any disclaimer, the term of this patent is extended or adjusted under 35 U.S.C. 154(b) by 96 days.

(21) Appl. No.: 10/465,238

(22) Filed: Jun. 20, 2003

(65) Prior Publication Data

US 2004/0049013 A1    Mar. 11, 2004

Related U.S. Application Data (60) Provisional application No. 60/401,782, filed on Aug. 8, 2002, provisional application No. 60/390,126, filed on Jun. 21, 2002.

(51) Int. Cl.
*A23J 1/14*    (2006.01)

(52) U.S. Cl. .................................................... 530/377

(58) Field of Classification Search ........ 530/377–378, 530/370
See application file for complete search history.

(56) References Cited

U.S. PATENT DOCUMENTS

| | | |
|---|---|---|
| 3,966,981 A | 6/1976 | Schultz |
| 4,169,090 A | 9/1979 | Murray et al. |
| 4,208,323 A | 6/1980 | Murray et al. |
| 4,285,862 A | 8/1981 | Murray et al. |
| 5,844,086 A | 12/1998 | Murray |
| 6,005,076 A * | 12/1999 | Murray ....................... 530/377 |

OTHER PUBLICATIONS

Lawhon J.T., processing methods to preserve quality and color of cottonseed flakes. (1969) p. 380-383, XP-008022632.

Rossini, M. and Germondari I., Production of a food-grade protein meal from defatted sunflower. (1982) vol. 15, p. 309-312, XP-008022630.

Stahl, E. et al. Extraction of seed oils with supercritical carbon dioxide: effect on residual proteins. (1984), 32, p. 938-940, XP-002256126.

* cited by examiner

*Primary Examiner*—Jon Weber
*Assistant Examiner*—Marsha Tsay
(74) *Attorney, Agent, or Firm*—Sim & McBurney (57) ABSTRACT

The recovery of protein from canola oil seed meal and other oil seed meals in the preparation of canola or other oil seed protein isolate is improved in comparison to conventional toasted meal by the use of a meal which has been air-desolventized at a temperature below about 50° C.

51 Claims, 3 Drawing Sheets

Figure 1 HPLC chromatogram of 0.05M saline extract of Marc meal at room temperature Figure 2 HPLC chromatogram of 0.10M saline extract of Marc meal at room temperature Figure 3 HPLC chromatogram of extract of Marc meal at 60°C

PROTEIN EXTRACTION FROM CANOLA OIL SEED MEAL

REFERENCE TO RELATED APPLICATIONS

This application claims priority under 35 USC 119(e) from U.S. Provisional Patent Applications No. 60/390,126 filed Jun. 21, 2002 and 60/401,782 filed Aug. 8, 2002.

FIELD OF INVENTION

The present invention is concerned with the recovery of protein from oil seed proteins, particularly canola oil seed protein.

BACKGROUND OF THE INVENTION

Canola oil seed is extensively processed for the recovery of canola oil therefrom. The canola oil seed is crushed to remove most of the oil and the residual meal is hot solvent extracted, generally using hexane, to recover the remainder of the oil. The residual meal from the solvent extraction contains residual hexane and is commonly known as "white flake" or less commonly as "marc" meal. The solvent is recovered from the meal for reuse before the oil seed meal is disposed of by the crusher. In the solvent recovery process, the oil seed meal often is heated to a higher temperature of about 120° to 140° C. in a procedure termed "toasting". The resulting meal is referred to as "toasted meal" or "high temperature produced meal".

The residual oil seed meal disposed of by the crusher contains significant quantities of protein and often is employed as animal feed. There have been prior procedures to recover the canola protein from the residual canola oil seed meal in the form of a canola protein isolate.

In U.S. Pat. Nos. 5,844,086 and 6,005,076 ("Murray II"), assigned to the assignee hereof and the disclosures of which are incorporated herein by reference, there is described a process for the isolation of protein isolates from oil seed meal having a significant fat content, including canola oil seed meal having such content. The steps involved in this process include solubilizing proteinaceous material from oil seed meal, which also solubilizes fat in the meal and removing fat from the resulting aqueous protein solution. The aqueous protein solution may be separated from the residual oil seed meal before or after the fat removal step. The defatted protein solution then is concentrated to increase the protein concentration while maintaining the ionic strength substantially constant, after which the concentrated protein solution may be subjected to a further fat removal step. The concentrated protein solution then is diluted to cause the formation of a cloud-like mass of highly aggregated protein molecules as discrete protein droplets in micellar form. The protein micelles are allowed to settle to form an aggregated, coalesced, dense, amorphous, sticky gluten-like protein isolate mass, termed "protein micellar mass" or PMM, which is separated from the residual aqueous phase and dried.

The protein isolate has a protein content (as determined by Kjeldahl or equivalent method N×6.25) of at least about 90 wt %, is substantially undenatured (as determined by differential scanning calorimetry) and has a low residual fat content. The term "protein content" as used herein refers to the quantity of protein in the protein isolate expressed on a dry weight basis. The yield of protein isolate obtained using this procedure, in terms of the proportion of protein extracted from the oil seed meal which is recovered as dried protein isolate was generally less than 40 wt %, typically around 20 wt %.

The procedure described in the aforementioned patents was developed as a modification to and improvement on the procedure for forming a protein isolate from a variety of protein source materials, including oil seeds, as described in U.S. Pat. No. 4,208,323 (Murray IB), the disclosure of which is incorporated herein by reference. The oil seed meals available in 1980, when U.S. Pat. No. 4,208,323 issued, did not have the fat contamination levels of canola oil seed meals at the time of Murray II patents, and, as a consequence, the procedure of U.S. Pat. No. 4,208,323 cannot produce from such oil seed meals processed according to the Murray II process, proteinaceous materials which have more than 90 wt % protein content. There is no description of any specific experiments in U.S. Pat. No. 4,208,323 carried out using rapeseed (canola) meal as the starting material.

U.S. Pat. No. 4,208,323 itself was designed to be an improvement on the process described in U.S. Pat. Nos. 4,169,090 and 4,285,862 (Murray IA), incorporated herein by reference, by the introduction of the concentration step prior to dilution to form the PMM. The latter step served to improve the yield of protein isolate from around 20% for the Murray IA process.

In copending U.S. Patent Applications No. 60/288,415 filed May 4, 2001, 60/326,987 filed Oct. 5, 2001, 60/331,066 filed Nov. 7, 2001, 60/333,494 filed Nov. 26, 2001, 60/374, 801 filed Apr. 24, 2002 and U.S. patent application Ser. No. 10/137,391 filed May 3, 2002 (WO 02/089597), all assigned to the assignee hereof and the disclosures of which are incorporated herein by reference, there is described a process for producing a protein isolate of high purity, containing at least about 100 wt % protein (N×6.25). In the aforementioned U.S. Patent Applications, the protein isolate is made by a process in which oil seed meal is extracted with a food grade salt solution, the resulting protein solution, after an initial treatment with a colourant adsorbent, if desired, is concentrated to a protein content of at least about 200 g/L, and the concentrated protein solution is diluted in chilled water to form protein micelles, which are allowed to settle to form an aggregated, coalesced, dense amorphous, sticky gluten-like protein isolate mass, termed "protein micellar mass" or PMM, which is separated from residual aqueous phase and may be used as such or dried.

In one embodiment of the process described above and as specifically described in U.S. Patent Applications Nos. 60/326,987, 60/331,066, 60/333,494, 60/374,801 and 10/137,391, the supernatant from the PMM settling step is processed to recover a protein isolate comprising dried protein from wet PMM and supernatant. This procedure may be effected by initially concentrating the supernatant using ultrafiltration membranes, mixing the concentrated supernatant with the wet PMM and drying the mixture. The resulting canola protein isolate has a high purity of at least about 90 wt %, preferably at least about 100 wt %, protein (N×6.25).

In another embodiment of the process described above and as significantly specifically described in Applications Nos. 60/331,066, 60/333,494, 60/374,801 and 10/137,391, the supernatant from the PMM settling step is processed to recover a protein from the supernatant. This procedure may be effected by initially concentrating the supernatant using ultrafiltration membranes and drying the concentrate. The resulting canola protein isolate has a high purity of at least about 90 wt %, preferably at least about 100 wt %, protein (N×6.25).

The procedures described in the aforementioned U.S. Patent Applications are essentially batch procedures. In copending U.S. Patent Applications No. 60/331,646 filed Nov. 20, 2001, 60/383,809 filed May 30, 2002 and 10/298,678 filed Nov. 19, 2002, assigned to the assignee hereof and the disclosures of which are incorporated herein by reference, there is described a continuous process for making canola protein isolates. In accordance therewith, canola oil seed meal is continuously mixed with a salt solution, the mixture is conveyed through a pipe while extracting protein from the canola oil seed meal to form an aqueous protein solution, the aqueous protein solution is continuously separated from residual canola oil seed meal, the aqueous protein solution is continuously conveyed through a selective membrane operation to increase the protein content of the aqueous protein solution to at least about 200 g/L while maintaining the ionic strength substantially constant, the resulting concentrated protein solution is continuously mixed with chilled water to cause the formation of protein micelles, and the protein micelles are continuously permitted to settle while the supernatant is continuously overflowed until the desired amount of PMM has accumulated in the settling vessel. The PMM is removed from the settling vessel and may be dried. The PMM has a protein content of at least about 90 wt % (N×6.25), preferably at least about 100 wt %.

The experimentation described in such prior U.S. patent applications is carried out on commercially-available oil seed meal which has been desolventized in a conventional desolventizer-toasting operation. Using such materials as the oil seed meal for production of oil seed protein isolate, results in extraction of less than about 30 wt % of the protein present in the oil seed, possibly due to denaturation of protein by the high temperature desolventizing operation.

SUMMARY OF THE INVENTION

It has now surprisingly been found that the amount of protein which can be extracted from canola oil seed protein meal can be significantly increased if the extraction is effected on ambient temperature desolventized meal. The ability to extract more protein from the meal improves the overall economics of the process. In addition a product of improved quality is obtained.

In accordance with one aspect of the present invention, there is provided a process of preparing a protein isolate, which comprises (a) crushing oil seeds to form oil and oil seed meal therefrom, (b) solvent extracting the oil seed meal to recover residual oil therefrom, (c) removing solvent from the extracted oil seed meal at a temperature of below about 50° C. to provide a desolventized oil seed meal, (d) extracting the desolventized oil seed meal to cause solubilization of protein in the desolventized oil seed meal and to form an aqueous protein solution having a pH of about 5 to about 6.8, (e) separating the aqueous protein solution from residual oil seed meal, (f) increasing the protein concentration of the aqueous protein solution while maintaining the ionic strength substantially constant by using a selective membrane technique to provide a concentrated protein solution, (g) diluting the concentrated protein solution into chilled water having a temperature of below about 15° C. to cause the formation of discrete protein particles in the aqueous phase at least partially in the form of micelles, (h) settling the protein micelles to form an amorphous, sticky, gelatinous, gluten-like protein micellar mass, and (i) recovering the protein micellar mass from supernatant, the protein micellar mass having a protein content of at least about 90 wt % (N×6.25) on a dry weight basis.

The present invention uses white flake or marc meal which has been desolventized at moderate temperatures below about 50° C., preferably at about 15° to about 30° C. Desolventizing may be effected by air drying the meal or by vacuum stripping.

The protein may be extracted and recovered from the ambient temperature desolventized meal by either a batch process, a semi-batch process or a continuous process as generally described in the aforementioned U.S. Patent applications.

The protein isolate produced according to the process herein may be used in conventional applications of protein isolates, such as, protein fortification of processed foods, emulsification of oils, body formers in baked goods and foaming agents in products which entrap gases. In addition, the protein isolate may be formed into protein fibers, useful in meat analogs, may be used as an egg white substitute or extender in food products where egg white is used as a binder. The canola protein isolate may be used as nutritional supplements. Other uses of the canola protein isolate are in pet foods, animal feed and in industrial and cosmetic applications and in personal care products.

GENERAL DESCRIPTION OF INVENTION

The process of the invention commences with oil seed, particularly canola oil seed, although the process may be applied to other oil seeds, such as soybean, traditional rapeseed, traditional flax, linola, sunflower and mustard oil seed meals. The invention is more particularly described herein with respect to canola oil seed meal.

The oil seed is washed to recover oil therefrom. Following separation of the oil, the residual meal is solvent extracted, usually using hexane, to recover residual amounts of oil from the meal. The resulting meal then is desolventized in accordance with the present invention at a temperature below about 50° C., preferably at about 15° to about 30° C. By effecting desolventizing in this manner, it has been found that the amount of protein which can be extracted from the meal is significantly increased.

The oil seed meal which is processed in this manner may be processed as described in the Murray I or II patents to recover protein isolate from the oil seed meal, details of which are described therein. Preferably, the procedure described in the aforementioned copending U.S. Patent Applications Nos. 60/288,415, 60/326,987, 60/331,066, 60/333,494, 60/372,165, 60/374,801 and 10/137,391 (WO 02/089567) is employed since there are obtained thereby improved yields of dried protein isolate, in terms of the proportion of the protein extracted from the oil seed meal which is recovered as protein isolate and a protein isolate of high protein content is obtained, usually at least about 100 wt % as determined by the Kjeldahl method as percent nitrogen (N) and multiplied by a factor of 6.25. Alternatively, the continuous process described in the aforementioned U.S. Applications Nos. 60/331,646, 60/383,809 and 10/298,678 may be employed. Details of these preferred procedures as applied to canola protein isolate are described below.

It will be understood that the processing of the oil seed to recover oil therefrom may be effected in a different facility from that at which the protein isolate is recovered from the oil seed meal. Alternatively, the operations may be combined at a single facility.

The initial step of the process of separating the canola protein isolate involves solubilizing proteinaceous material from canola oil seed meal. The proteinaceous material recovered from canola seed meal may be the protein naturally occurring in canola seed or other oil seed or the proteinaceous material may be a protein modified by genetic manipulation but possessing characteristic hydrophobic and polar properties of the natural protein. Canola oil seed is also known as rapeseed or oil seed rape.

Protein solubilization is effected most efficiently by using a food grade salt solution since the presence of the salt enhances the removal of soluble protein from the oil seed meal. Where the canola protein isolate is intended for non-food uses, non-food grade chemicals may be employed. The food grade salt usually is sodium chloride, although other salts, such as, potassium chloride, may be used. The food grade salt solution has an ionic strength of at least about 0.10, preferably at least about 0.15, to enable solubilization of significant quantities of protein to be effected. As the ionic strength of the salt solution increases, the degree of solubilization of protein in the oil seed meal initially increases until a maximum value is achieved. Any subsequent increase in ionic strength does not increase the total protein solubilized. The ionic strength of the food grade salt solution which causes maximum protein solubilization varies depending on the salt concerned and the oil seed meal chosen.

In view of the greater degree of dilution required for protein precipitation with increasing ionic strengths, it is usually preferred to utilize an ionic strength value less than about 0.8, and more preferably a value of about 0.15 to about 0.6.

In a batch process, the salt solubilization of the protein is effected at a temperature of at least about 5° and preferably up to about 35° C., preferably accompanied by agitation to decrease the solubilization time, which is usually about 10 to about 60 minutes. It is preferred to effect the solubilization to extract substantially the maximum amount of protein from the oil seed meal, so as to provide an overall high product yield.

The lower temperature limit of about 5° C. is chosen since solubilization is impractically slow below this temperature while the upper preferred temperature limit of about 35° C. is chosen since the process becomes uneconomic at higher temperature levels in a batch mode.

In a continuous process, the extraction of the protein from the canola oil seed meal is carried out in any manner consistent with effecting a continuous extraction of protein from the canola oil seed meal. In one embodiment, the canola oil seed meal is continuously mixed with a salt solution and the mixture is conveyed through a pipe or conduit having a length and at a flow rate for a residence time sufficient to effect the desired extraction in accordance with the parameters described herein. In such continuous procedure, the salt solubilization step is effected rapidly, in a time of up to about 10 minutes, preferably to effect solubilization to extract substantially the maximum amount of protein from the canola oil seed meal. The solubilization in the continuous procedure preferably is effected at elevated temperatures, preferably above about 35° C., generally up to about 65° C. or more.

The aqueous food grade salt solution and the canola oil seed meal have a natural pH of about 5 to about 6.8 to enable a protein isolate to be formed by the micellar route, as described in more detail below.

At and close to the limits of the pH range, protein isolate formation occurs only partly through the micelle route and in lower yields than attainable elsewhere in the pH range. For these reasons, pH values of about 5.3 to about 6.2 are preferred.

The pH of the food grade salt solution may be adjusted to any desired value within the range of about 5 to about 6.8 for use in the extraction step by the use of any convenient food grade acid, usually hydrochloric acid, or food grade alkali, usually sodium hydroxide, as required. Where the canola protein isolate is intended for non-food uses, then non-food grade chemicals may be used.

The concentration of oil seed meal in the food grade salt solution during the solubilization step may vary widely. Typical concentration values are about 5 to about 15% w/v.

The protein extraction step with the aqueous salt solution has the additional effect of solubilizing fats which may be present in the canola meal, which then results in the fats being present in the aqueous phase.

The protein solution resulting from the extraction step generally has a protein concentration of about 5 to about 40 g/L, preferably about 10 to about 30 g/L.

The aqueous phase resulting from the extraction step then may be separated from the residual canola meal, in any convenient manner, such as by employing vacuum filtration, followed by centrifugation and/or filtration to remove residual meal. The separated residual meal may be dried for disposal.

The colour of the final canola protein isolate can be improved to obtain a lighter and less intense yellow colour by the mixing of powdered activated carbon or other pigment adsorbing agent with the separated aqueous protein solution and subsequently removing the adsorbent, conveniently by filtration, to provide a protein solution. Diafiltration of the separated aqueous protein solution, before or after concentration, as described below, also may be used for pigment removal.

Such pigment removal step may be carried out under any convenient conditions, generally at the ambient temperature of the separated aqueous protein solution, employing any suitable pigment adsorbing agent. For powdered activated carbon, an amount of about 0.025% to about 5% w/v, preferably about 0.05% to about 2% w/v, is employed.

Where the canola seed meal contains significant quantities of fat, as described in the aforementioned U.S. Pat. Nos. 5,844,086 and 6,005,076, then the defatting steps described therein may be effected on the separated aqueous protein solution and on the concentrated aqueous protein solution discussed below. When the colour improvement step is carried out, such step may be effected after the first defatting step.

As an alternative to extracting the oil seed meal with an aqueous food grade salt solution, such extraction may be made using water alone, although the utilization of water alone tends to extract less protein from the oil seed meal than the aqueous food grade salt solution. Where such alternative is employed, then the food grade salt, in the concentrations discussed above, may be added to the protein solution after separation from the residual oil seed meal in order to maintain the protein in solution during the concentration step described below. When a colour removal step and/or a first fat removal step is carried out, the food grade salt generally is added after completion of such operations.

Another alternative procedure is to extract the oil seed meal with the food grade salt solution at a relatively high pH value above about 6.8, generally up to about 9.8. The pH of the food grade salt solution, may be adjusted in pH to the alkaline value by the use of any convenient food-grade alkali, such as aqueous sodium hydroxide solution. Where such alternative is employed, the aqueous phase resulting from the oil seed meal extraction step then is separated from the residual canola meal, in any convenient manner, such as by employing vacuum filtration, followed by centrifugation and/or filtration to remove residual meal. The separated residual meal may be dried for disposal.

The aqueous protein solution resulting from the high pH extraction step then is pH adjusted to the range of about 5 to about 6.8, preferably about 5.3 to about 6.2, as discussed above, prior to further processing as discussed below. Such pH adjustment may be effected using any convenient food grade acid, such as hydrochloric acid.

The aqueous protein solution then is concentrated to increase the protein concentration thereof while maintaining the ionic strength thereof substantially constant. Such concentration generally is effected to provide a concentrated protein solution having a protein concentration of at least about 200 g/L, preferably at least about 250 g/L.

The concentration step may be effected in any convenient manner consistent with batch or continuous operation, such as by employing any convenient selective membrane technique, such as ultrafiltration or diafiltration, using membranes, such as hollow-fibre membranes or spiral-wound membranes, with a suitable molecular weight cut-off, such as about 3000 to about 50,000 daltons, having regard to differing membrane materials and configurations, and, for continuous operation, dimensioned to permit the desired degree of concentration as the aqueous protein solution passes through the membranes.

The concentration step may be effected at any convenient temperature, generally about 20° to about 60° C., and for the period of time to effect the desired degree of concentration. The temperature and other conditions used to some degree depend upon the membrane equipment used to effect the concentration and the desired protein concentration of the solution.

The concentrating of the protein solution to a concentration above about 200 g/L in this step not only increases the process yield to levels above about 40% in terms of the proportion of extracted protein which is recovered as dried protein isolate, preferably above about 80%, but also decreases the salt concentration of the final protein isolate after drying. The ability to control the salt concentration of the isolate is important in applications of the isolate where variations in salt concentrations affect the functional and sensory properties in a specific food application.

As is well known, ultrafiltration and similar selective membrane techniques permit low molecular weight species to pass therethrough while preventing higher molecular weight species from so doing. The low molecular weight species include not only the ionic species of the food grade salt but also low molecular weight materials extracted from the source material, such as, carbohydrates, pigments and anti-nutritional factors, as well as any low molecular weight forms of the protein. The molecular weight cut-off of the membrane is usually chosen to ensure retention of a significant proportion of the protein in the solution, while permitting contaminants to pass through having regard to the different membrane materials and configurations.

Depending on the temperature employed in the concentration step, the concentrated protein solution may be warmed to a temperature of at least about 20°, and up to about 60° C., preferably about 25° to about 40° C., to decrease the viscosity of the concentrated protein solution to facilitate performance of the subsequent dilution step and micelle formation. The concentrated protein solution should not be heated beyond a temperature above which the temperature of the concentrated protein solution does not permit micelle formation on dilution by chilled water. The concentrated protein solution may be subject to a further defatting operation, if required, as described in the aforementioned U.S. Pat. Nos. 5,844,086 and 6,005,076.

The concentrated protein solution resulting from the concentration step and optional defatting step then is diluted to effect micelle formation by mixing the concentrated protein solution with chilled water having the volume required to achieve the degree of dilution desired. Depending on the proportion of canola protein desired to be obtained by the micelle route and the proportion from the supernatant, the degree of dilution of the concentrated protein solution may be varied. With higher dilution levels, in general, a greater proportion of the canola protein remains in the aqueous phase.

When it is desired to provide the greatest proportion of the protein by the micelle route, the concentrated protein solution is diluted by about 15 fold or less, preferably about 10 fold or less.

The chilled water with which the concentrated protein solution is mixed has a temperature of less than about 15° C., generally about 3° to about 15° C., preferably less than about 10° C., since improved yields of protein isolate in the form of protein micellar mass are attained with these colder temperatures at the dilution factors used.

In a batch operation, the batch of concentrated protein solution is added to a static body of chilled water having the desired volume, as discussed above. The dilution of the concentrated protein solution and consequential decrease in ionic strength causes the formation of a cloud-like mass of highly associated protein molecules in the form of discrete protein droplets in micellar form. In the batch procedure, the protein micelles are allowed to settle in the body of chilled water to form an aggregated, coalesced, dense, amorphous sticky gluten-like protein micellar mass PMM. The settling may be assisted, such as by centrifugation. Such induced settling decreases the liquid content of the protein micellar mass, thereby decreasing the moisture content generally from about 70% by weight to about 95% by weight to a value of generally about 50% by weight to about 80% by weight of the total micellar mass. Decreasing the moisture content of the micellar mass in this way also decreases the occluded salt content of the micellar mass, and hence the salt content of dried isolate.

Alternatively, the dilution operation may be carried out continuously by continuously passing the concentrated protein solution to one inlet of a T-shaped pipe, while the diluting water is fed to the other inlet of the T-shaped pipe, permitting mixing in the pipe. The diluting water is fed into the T-shaped pipe at a rate sufficient to achieve the desired degree of dilution.

The mixing of the concentrated protein solution and the diluting water in the pipe initiates the formation of protein micelles and the mixture is continuously fed from the outlet from the T-shaped pipe into a settling vessel, from which, when full, supernatant is permitted to overflow. The mixture preferably is fed into the body of liquid in the settling vessel in a manner which minimizes turbulence within the body of liquid.

In the continuous procedure, the protein micelles are allowed to settle in the settling vessel to form an aggregated, coalesced, dense, amorphous, sticky, gluten-like protein micellar mass (PMM) and the procedure is continued until a desired quantity of the PMM has accumulated in the bottom of the settling vessel, whereupon the accumulated PMM is removed from the settling vessel.

The combination of process parameters of concentrating of the protein solution to a protein content of at least about 200 g/L and the use of a dilution factor less than about 15, result in higher yields, often significantly higher yields, in terms of recovery of protein in the form of protein micellar mass from the original meal extract, and much purer isolates in terms of protein content than achieved using any of the known prior art protein isolate forming procedures discussed in the aforementioned U.S. patent applications.

The settled isolate is separated from the residual aqueous phase or supernatant, by such methods as decantation of the residual aqueous phase from the settled mass or centrifugation. The PMM may be used in the wet form or may be dried, by any convenient technique, such as spray drying, freeze drying or vacuum drum drying, to a dry form. The dry PMM has a high protein content, in excess of about 90 wt % protein, preferably at least about 100 wt % protein (calculated as Kjeldahl N×6.25), and is substantially undenatured (as determined by differential scanning calorimetry). The dry PMM isolated from fatty oil seed meal also has a low residual fat content, when the procedures of the aforementioned U.S. Pat. Nos. 5,844,086 and 6,005,076 are employed, which may be below about 1 wt %.

The supernatant from the PMM formation and settling step contains significant amounts of canola protein, not precipitated in the dilution step, and is processed to recover canola protein isolate therefrom. The supernatant from the dilution step, following removal of the PMM, is concentrated to increase the protein concentration thereof. Such concentration is effected using any convenient selective membrane technique, such as ultrafiltration, using membranes with a suitable molecular weight cut-off permitting low molecular weight species, including the food grade salt and other non-proteinaceous low molecular weight materials extracted from the protein source material, to pass through the membrane, while retaining canola protein in the solution. Ultrafiltration membranes having a molecular weight cut-off of about 3000 to 10,000 daltons, having regard to differing membrane materials and configuration, may be used. Concentration of the supernatant in this way also reduces the volume of liquid required to be dried to recover the protein. The supernatant generally is concentrated to a protein concentration of about 100 to about 400 g/L, preferably about 200 to about 300 g/L, prior to drying. Such concentration operation may be carried out in a batch mode or in a continuous operation, as described above for the protein solution concentration step.

The concentrated supernatant may be dried by any convenient technique, such as spray drying, freeze drying or vacuum drum drying, to a dry form to provide a further canola protein isolate. Such further canola protein isolate has a high protein content, in excess of about 90 wt %, preferably at least about 100 wt % protein (calculated as N×6.25) and is substantially undenatured (as determined by differential scanning calorimetry).

If desired, at least a portion of the wet PMM may be combined with at least a portion of the concentrated supernatant prior to drying the combined protein streams by any convenient technique to provide a combined canola protein isolate composition according to one invention. The relative proportions of the proteinaceous materials mixed together may be chosen to provide a canola protein isolate composition having a desired profile of 2S/7S/12S proteins. Alternatively, the dried protein isolates may be combined in any desired proportions to provide any desired specific 2S/7S/12S protein profile in the mixture. The combined canola protein isolate composition has a high protein content, in excess of about 90 wt %, preferably at least about 100 wt %, (calculated as N×6.25) and is substantially undenatured (as determined by differential scanning calorimetry).

In another alternative procedure, where a portion only of the concentrated supernatant is mixed with a part only of the PMM and the resulting mixture dried, the remainder of the concentrated supernatant may be dried as may any of the remainder of the PMM. Further, dried PMM and dried supernatant also may be dry mixed in any desired relative proportions, as discussed above.

By operating in this manner, a number of canola protein isolates may be recovered, in the form of dried PMM, dried supernatant and dried mixtures of various proportions by weight of PMM and supernatant, generally from about 5:95 to about 95:5 by weight, which may be desirable for attaining differing functional and nutritional properties.

As an alternative to dilution of the concentrated protein solution into chilled water and processing of the resulting precipitate and supernatant as described above, protein may be recovered from the concentrated protein solution by dialyzing the concentrated protein solution to reduce the salt content thereof. The reduction of the salt content of the concentrated protein solution results in the formation of protein micelles in the dialysis tubing. Following dialysis, the protein micelles may be permitted to settle, collected and dried, as discussed above. The supernatant from the protein micelle settling step may be processed, as discussed above, to recover further protein therefrom. Alternatively, the contents of the dialysis tubing may be directly dried. The latter alternative procedure is useful where small laboratory scale quantities of protein are desired.

EXAMPLES

Example 1

This Example illustrates the process of the invention.

75 g samples of canola oil seed meal which had been air-desolventized at ambient temperature (20° C.) were added to 500 ml samples of 0.15 M NaCl solution at ambient or room temperature (RT), 55° C., 60° C. and 65° C., agitated for 30 minutes while maintaining the temperature of the solution substantially constant to provide aqueous protein solutions. Samples of aqueous protein solution were taken at 5, 10, 15, 20 and 30 minutes for analysis. The spent meal was separated by centrifugation at 10,000×g for 5 minutes and freeze-dried.

The protein concentrations of the various aqueous protein solutions obtained in these experiments were determined and the results appear in the following Table I:

TABLE I

| Extraction Time (min) | Protein Concentration in Extracts (wt %) | | | |
|---|---|---|---|---|
| | RT* | 55° C. | 60° C. | 65° C. |
| 5 | 2.97 | 3.33 | 3.33 | 3.37 |
| 10 | 3.21 | 3.39 | 3.52 | 3.40 |

TABLE I-continued

Protein Concentration in Extracts (wt %)

| Extraction Time (min) | RT* | 55° C. | 60° C. | 65° C. |
|---|---|---|---|---|
| 15 | 3.22 | 3.47 | 3.59 | 3.41 |
| 20 | 3.21 | 3.51 | 3.53 | 3.39 |
| 30 | 3.17 | 3.46 | 3.63 | 3.14 |

*Room Temperature (20° C.)

As may be seen from this data, extraction at elevated temperature proceeded faster than at room temperature. Extraction in terms of maximum protein concentration reached equilibrium within 5 minutes at elevated temperatures, while extraction at room temperature usually took 10 minutes. As the extraction temperature rose from room temperature to 60° C., the protein concentration of the extract increased by over 10% while a further rise in temperature resulted in a slightly decreased extractability.

Based on the protein concentration data set forth in Table I, protein extractabilities were calculated and the results appear in the following Table II:

TABLE II

Protein Extractability at Different Temperatures*

| Temperature (° C.) | Extractability (wt %) |
|---|---|
| RT | 50.1 |
| 55 | 54.0 |
| 60 | 55.9 |
| 65 | 53.9 |

*Defined as percentage of the amount of protein extracted as of the total amount of protein in the meal As may be seen from this data, the extractability of the protein in the canola oil seed meal exceeded 50 wt % at all temperatures tested, a considerable improvement over the maximum 30 wt % achieved with commercial toasted canola oil seed meal.

Example 2

This Example shows the effects of certain parameters on protein extractability.

In a first set of experiments, 50 g samples of (a) canola oil seed meal which had been air-desolventized at ambient temperature (20° C.) or (b) commercial canola oil seed meal which had been desolventized by conventional toasting (toasted commercial meal) were added to 500 mL samples of 0.05 M or 0.10 M NaCl solution at room temperature (20° C.) and stirred for 15 minutes. The slurry was centrifuged at 5000 ×g for 10 minutes to remove the spent meal.

In a second set of experiments, 500 mL of water with no salt added was first heated to 60° C. on a hot plate stirrer and then (a) 50 g of canola oil seed meal which had been air-desolventized at ambient temperature (20° C.) (Marc meal) or (b) commercial canola oil seed meal which had been desolventized by conventional toasting (commercial meal) was added and stirred for 15 minutes while the temperature was maintained. The extract was separated from the spent meal by centrifugation at 5000×g for 10 minutes.

The protein concentration of the various aqueous protein solutions obtained in these experiments were determined and appear in the following Table V:

TABLE V

Protein Concentrations in Extracts (wt %)

| | 0.05 M saline | 0.10 M saline | 60° C. water |
|---|---|---|---|
| Ambient temperature desolventized meal | 2.09 | 2.04 | 1.38 |
| Toasted commercial meal | 0.75 | 0.85 | 0.60 |

The protein extractability from the meals was determined from the protein concentration data of Table V and this data is presented in Table VI:

TABLE VI

Protein Extractability (wt %)*

| | 0.05 M saline | 0.10 M saline | 60° C. water |
|---|---|---|---|
| Ambient temperature desolventized meal | 49.6 | 48.4 | 32.7 |
| Toasted commercial meal | 17.0 | 20.0 | 14.0 |

*Defined as percentage of the amount of protein extracted as of the total amount of protein in the meal.

Table VI shows that the protein extractability of the Marc meal at both salt concentrations were comparable with a 15 wt % meal and 0.15 M salt concentration at room temperature (see Table II above). The protein extraction of the Marc meal at 0.05 M NaCl was comparable with that at 0.10 M NaCl. In the case of no salt added, the protein extractability was substantially lower at the elevated temperature than that using 0.05 and 0.10 M salt at room temperature. In all cases, however, the protein extractability and protein concentrations were significantly higher than obtained with toasted commercial meal.

A third set of experiments was performed at room temperature in the same manner as the room temperature experiments described above but a salt concentration of 0.01M, 0.02M, 0.03M, 0.04M and 0.05M. The protein extractabilities were determined for each extract and the results appear in the following VII:

TABLE VII

Protein Extractability of Marc Meal at Low Salt Concentration

| Salt Concentration (M) | Protein Extractability (wt %) |
|---|---|
| 0.05 | 49.6 |
| 0.04 | 43.4 |
| 0.03 | 38.8 |
| 0.02 | 40.3 |
| 0.01 | 38.5 |

As may be seen from the data presented in Table VII, a substantial decrease in protein extractability was observed between salt concentrations, of 0.04M and 0.05M, suggesting that a minimum salt concentration to obtain a good yield of protein in the extract solution is 0.05M.

A Varian high pressure liquid chromatography column (HPLC), using a 30 cm BioSep S3000 Size Exclusion Chromatography (SEC) column containing hydrophilic-bonded silica rigid support media, 5-micron diameter, 290-Angstrom pore size, capable of separating globular proteins from 5,000 to 700,000 dalton size, was run with a series of standards of protein origin to determine the residence time (RT) of each component, as measured at A280 nm, at an elution flow rate of 1.0 mL/min. The BioRad standard proteins cover a range from 17,000 daltons (myoglobulin) to 670,000 daltons (thyroglobulin) with Vitamin B12 added as a low molecular mass marker at 1,350 daltons. Each component is measured at 280 nm at an elution flow rate of 1.0 mL/min. Saline solution, pH adjusted and containing sodium azide as an antibacterial agent, was used as the column solvent and to dissolve dry samples. Eluant was discarded after UV detection as only 25 to 50 microliters of sample are required per run. The HPLC Prostar system automatically calculated retention times and peak areas and printed out a summary report.

Samples of the extracts prepared as described in this Example were run on each column. The peak area counts were converted to percentage for each peak. All peaks on different runs were taken into calculation and then the three major protein fractions, 12S, 7S and 2S, were recalculated separately. The results obtained are shown in the graphical data of FIGS. 1 to 3.

Figure 1:
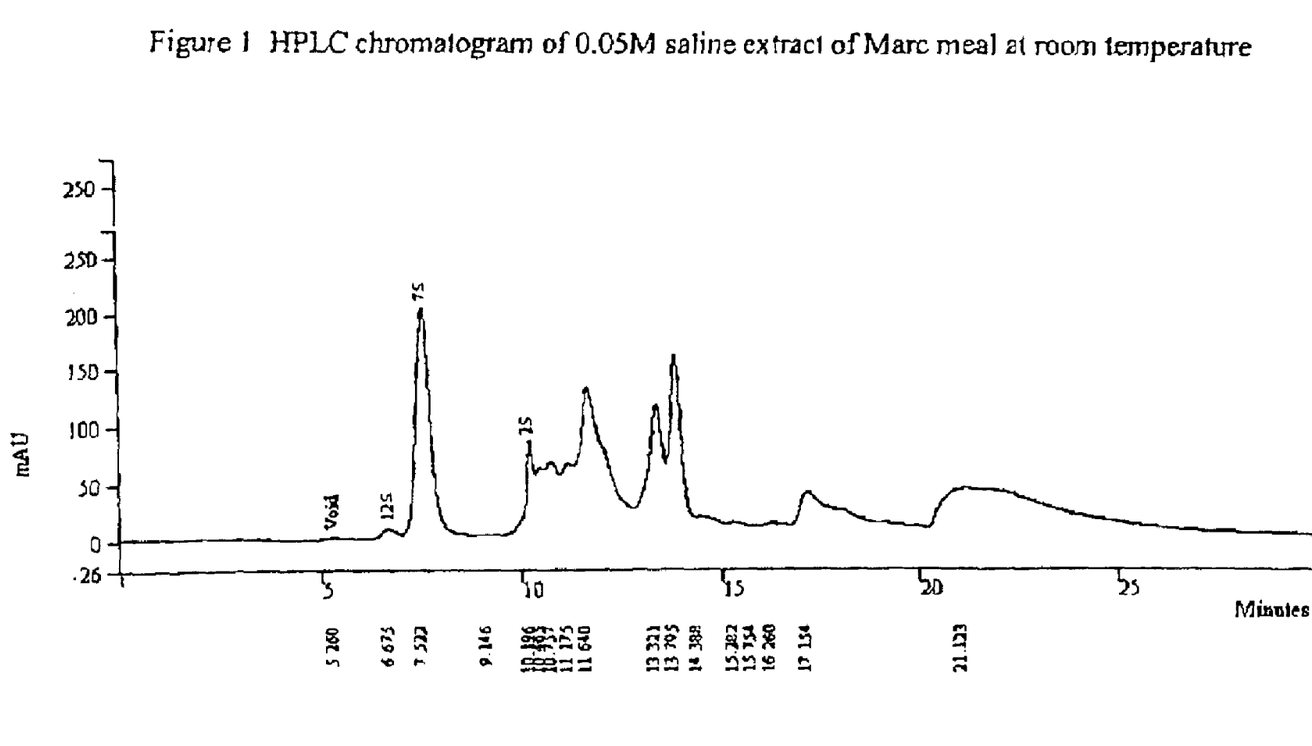
FIGS. 1 to 3 are HPLC chromatograms of extractions of canola oil seed meal which has been air-desolventized meal at room temperature using 0.05 M NaCl (FIG. 1) and 0.10 M NaCl (FIG. 2) and at 60° C. in the absence of salt (FIG. 3).
Figure 2:
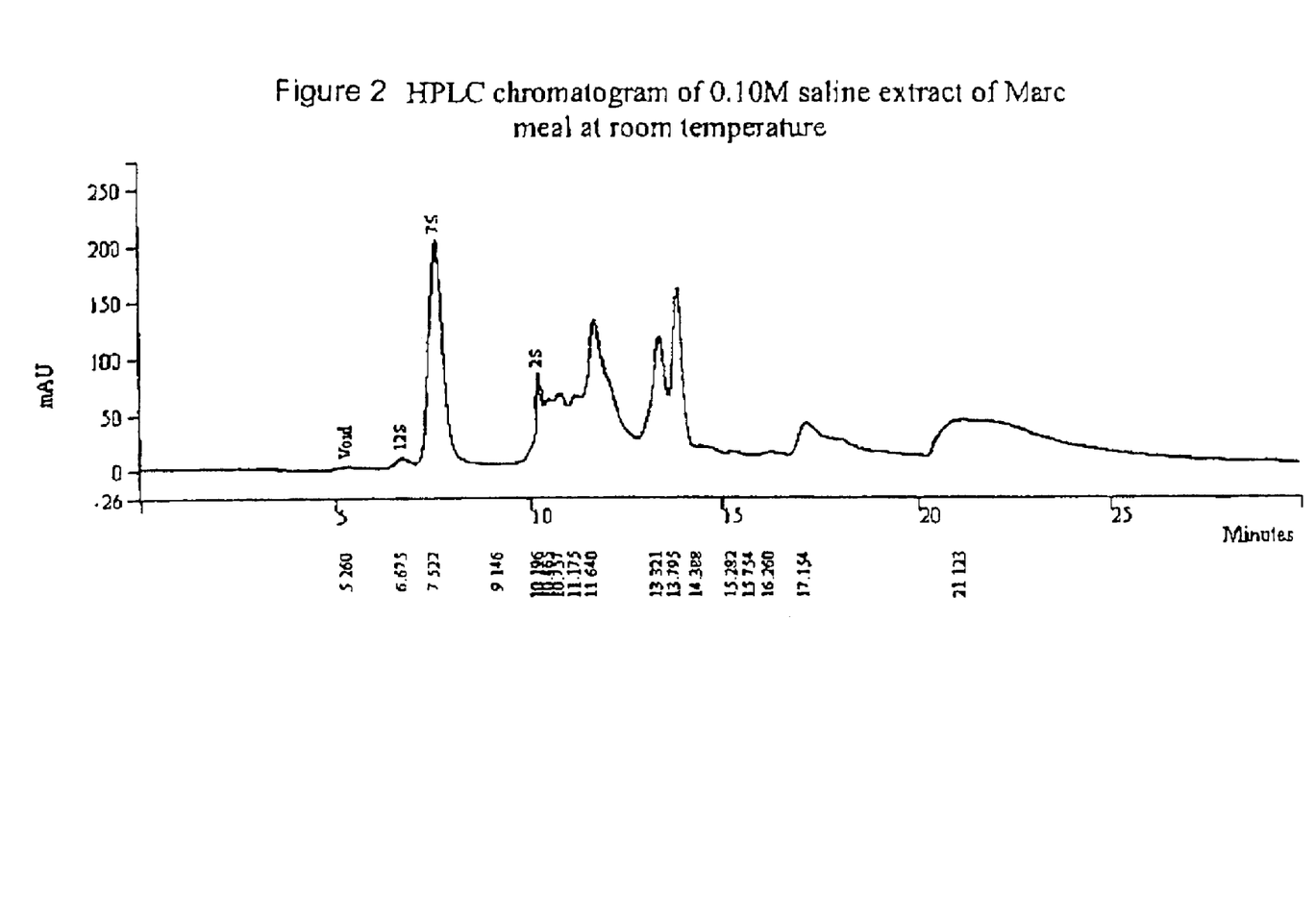
Figure 3:
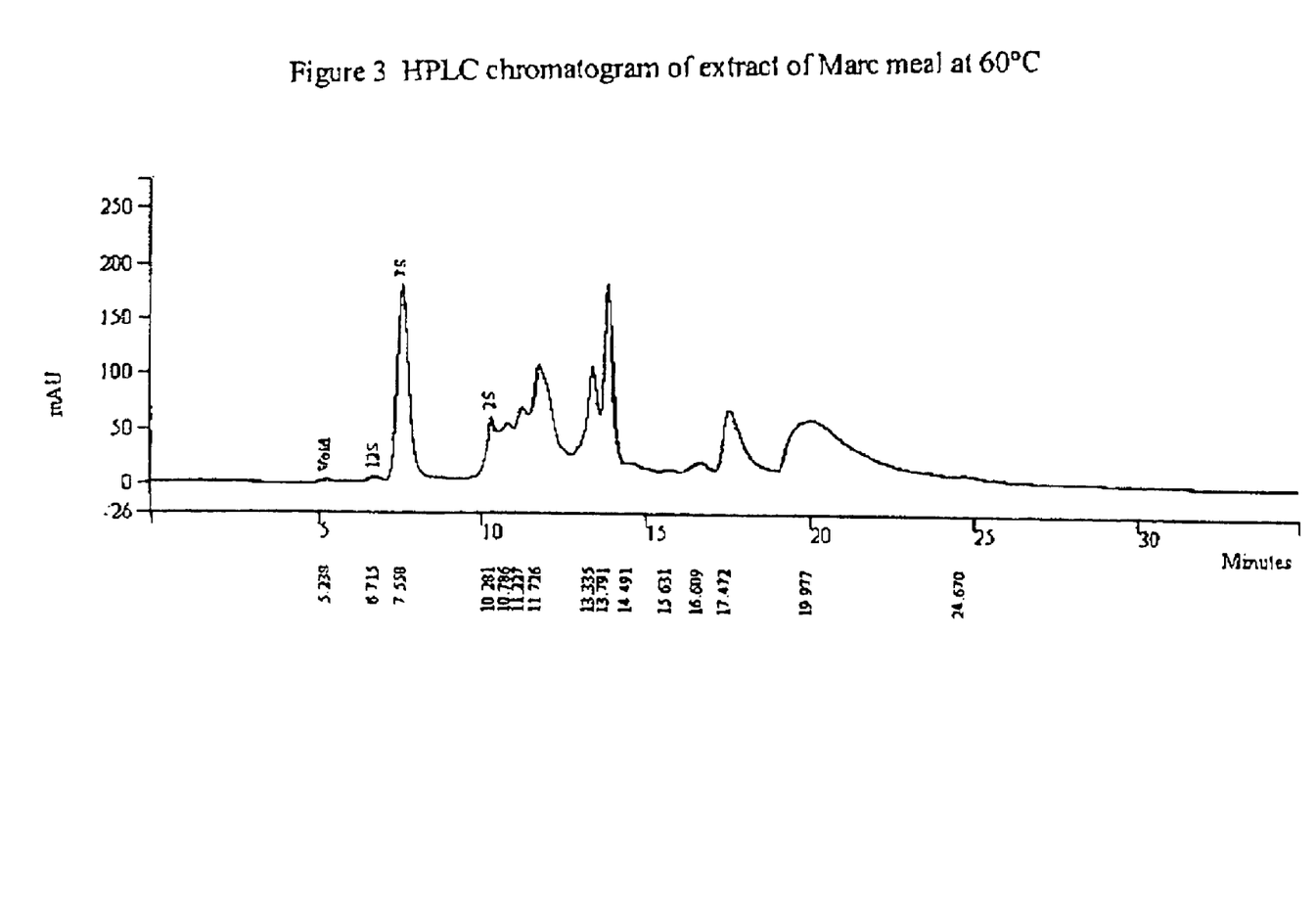

Each chromatogram showed a distinct peak representing 7S canola protein fraction and a small bump of 12S canola protein fraction. The peak for the 2S canola protein fraction was present among peaks for other components of the extract. The peaks in the lower molecular weight end of the chromatogram were not properly identified, but likely correspond to non-protein nitrogenous compounds, such as short peptides and free amino acids, as well as other meal components, such as phenolic compounds, glucosinolates and phytates.

Example 3

This Example further illustrates the preparation of a canola protein isolate using air-desolventized canola oil seed meal.

160 kg of marc canola meal which had been air-desolventized at 20° C. was added to 1602 L of 0.15 M NaCl at 17.6° C. and agitated for 30 minutes to provide an aqueous protein solution having a protein content of 21.4 g/L. 0.05 wt % of ascorbic acid was added after 15 minutes of the extraction time. The percentage protein in the meal which was extracted was 51.6%.

The residual canola meal was removed and washed on a vacuum filter belt. The resulting protein solution was clarified by centrifugation and filtration to produce 1270 L of a clarified protein solution having a protein content of 16.2 g/L.

1270 L of the protein extract solution was reduced in volume to 71 L by concentration on an ultrafiltration system using 5000 dalton molecular weight cut-off membranes. The protein extract solution then was diafiltered on a diafiltration system using 5000 dalton molecular weight cut-off membranes with 5000 L (5 retentate volumes) of 0.15 M saline solution containing 0.05 wt % ascorbic acid to a final volume of 31 L with a protein content of 226 g/L. The retentate was pasteurized at 60° C. for 10 minutes.

The concentrated and diafiltered solution was divided into three batches of 30 L, 30 L and 8 L respectively. A first batch at 30° C. was diluted 1:15 into 450 L of filtered water at 4° C. A white cloud of protein micelles formed immediately and was allowed to settle. The upper diluting water was removed. This procedure was repeated for the second and third batches. The precipitated, viscous, sticky mass (PMM) was removed from the bottom of the vessel. The dried protein was found to have a protein content of 102.4 wt % (N×6.25) d.b. (Percentage nitrogen values were determined using a Leco FP 328 Nitrogen Determinator). The product was given designation BW-AA020-C17-03A-C300.

988 L of supernatant from the protein micelle formation were concentrated to 38 L on a ultrafiltration system using 5000 dalton molecular weight cut-off membranes. The concentrated supernatant then was diafiltered on a diafiltration system using 5000 dalton molecular weight cut-off membranes with 130 L (4 retentate volumes) of water to a final volume of 38 L with a protein content of 194 g/L.

The concentrated and diafiltered solution was diluted to a pumpable consistency and was then spray dried. The dried protein was found to have a protein content of 97.6 wt % (N×6.25) d.b. The product was given designation BW-AA020-C17-03A-C200.

SUMMARY OF DISCLOSURE

In summary of this disclosure, the present invention provides an improved process for making oil seed protein isolates from oil seed meals by using an ambient temperature desolventized meal to provide a greater degree of extraction of protein from the meal leading to economic benefits. Modifications are possible within the scope of this invention.

What we claim is:

1. A process of preparing a protein isolate, which comprises:
   (a) crushing oil seeds to form oil and oil seed meal therefrom,
   (b) solvent extracting the oil seed meal to recover residual oil therefrom,
   (c) removing solvent from the extracted oil seed meal at a temperature of below 50° C. to provide a desolventized oil seed meal,
   (d) extracting the desolventized oil seed meal to cause solubilization of protein in said desolventized oil seed meal and to form an aqueous protein solution having a pH of about 5 to about 6.8,
   (e) separating the aqueous protein solution from residual oil seed meal,
   (f) increasing the protein concentration of said aqueous protein solution while maintaining the ionic strength substantially constant by using a selective membrane technique to provide a concentrated protein solution,
   (g) diluting said concentrated protein solution into chilled water having a temperature of below 15° C. to cause the formation of discrete protein particles in the aqueous phase in the form of micelles,
   (h) settling the protein micelles to form an amorphous, sticky, gelatinous, gluten-like protein micellar mass, and
   (i) recovering the protein micellar mass from supernatant, the protein micellar mass having a protein content of at least 100 wt % (N×6.25) on a dry weight basis.

2. The process of claim 1 wherein said steps (d) to (i) are effected in a batch mode of operation.

3. The process of claim 2 wherein said extracting of said oil seed meal is effected using an aqueous salt solution having an ionic strength of at least 0.10 and a pH of about 5 to about 6.8 and said aqueous protein solution has a protein content of about 5 to about 40 g/L.

4. The process of claim 3 wherein said salt solution has an ionic strength of about 0.15 to about 0.6.

5. The process of claim 3 wherein said salt solution has a pH of about 5.3 to about 6.2.

6. The process of claim 3 wherein said extracting of said oil seed meal is effected with agitation of said aqueous salt solution for about 10 to about 30 minutes.

7. The process of claim 6 wherein the concentration of oil seed meal in said aqueous salt solution during said extracting step is about 5 to about 15% w/v.

8. The process of claim 3 wherein said aqueous protein solution resulting from the extraction step has a concentration of about 10 to about 30 g/L.

9. The process of claim 2 wherein said concentrated protein solution is diluted by about 15 fold or less by adding the concentrated protein solution into a body of water having the volume required to achieve the desired degree of dilution.

10. The process of claim 9 wherein said body of water has a temperature of less than 10° C.

11. The process of claim 1 wherein said extracting of said oil seed meal is affected using an aqueous salt solution having an ionic strength of at least 0.10 and a pH of about 3 to about 5 or about 6.8 to about 9.9 and, following said separation of the aqueous protein solution from residual oil seed meal, the pH of the aqueous protein solution is adjusted to a pH of about 5 to about 6.8.

12. The process of claim 11 wherein said salt solution has a ionic strength of about 0.15 to about 0.6.

13. The process of claim 11 wherein the pH of the aqueous protein solution is adjusted to a pH of 5.3 to about 6.2.

14. The process of claim 1 wherein the recovered protein micellar mass is dried to a proteinaceous powder.

15. The process of claim 1 wherein said oil seed meal is canola oil seed meal.

16. The process of claim 15 wherein the canola oil seed meal is cold pressed canola oil seed meal.

17. The process of claim 15 wherein the canola oil seed meal is derived from a non-genetically modified canola oil seed.

18. The process of claim 1 wherein said oil seed meal is mustard seed meal.

19. A process of preparing a protein isolate, which comprises:
(a) crushing oil seeds to form oil and oil seed meal therefrom,
(b) solvent extracting the oil seed meal to recover residual oil therefrom,
(c) removing solvent from the extracted oil seed meal at a temperature of below 50° C. to provide a desolventized oil seed meal,
(d) extracting the desolventized oil seed meal to cause solubilization of protein in said desolventized oil seed meal and to form an aqueous protein solution having a pH of about 5 to about 6.8
(e) separating the aqueous protein solution from residual oil seed meal,
(f) increasing the protein concentration of said aqueous protein solution while maintaining the ionic strength substantially constant by using a selective membrane technique to provide a concentrated protein solution,
(g) diluting said concentrated protein solution into chilled water having a temperature of below 15° C. to cause the formation of discrete protein particles in the aqueous phase in the form of micelles,
(h) settling the protein micelles to form an amorphous, sticky, gelatinous, gluten-like like protein micellar mass, and
(i) recovering the protein micellar mass from supernatant, the protein micellar mass having a protein content of at least 90 wt % (N×6.25) on a dry weight basis,
wherein said steps (d) to (i) are effected in a semi-continuous mode of operation.

20. A process of preparing a protein isolate, which comprises:
(a) crushing oil seeds to form oil and oil seed meal therefrom,
(b) solvent extracting the oil seed meal to recover residual oil therefrom,
(c) removing solvent from the extracted oil seed meal at a temperature of below 50° C. to provide a desolventized oil seed meal,
(d) extracting the desolventized oil seed meal to cause solubilization of protein in said desolventized oil seed meal and to form an aqueous protein solution having a pH of about 5 to about 6.8
(e) separating the aqueous protein solution from residual oil seed meal,
(f) increasing the protein concentration of said aqueous protein solution while maintaining the ionic strength substantially constant by using a selective membrane technique to provide a concentrated protein solution,
(g) diluting said concentrated protein solution into chilled water having a temperature of below 15° C. to cause the formation of discrete protein particles in the aqueous phase in the form of micelles,
(h) settling the protein micelles to form an amorphous, sticky, gelatinous, gluten-like protein micellar mass, and
(i) recovering the protein micellar mass from supernatant, the protein micellar mass having a protein content of at least about 90 wt % (N×6.25) on a dry weight basis,
wherein said steps (d) to (i) are effected in a continuous mode of operation.

21. The process of claim 20 wherein said extraction step is effected by:
(i) continuously mixing an oil seed meal with an aqueous salt solution having an ionic strength of at least 0.10 and a pH of about 5 to about 6.8 at a temperature of about 5° C. to about 65° C., and
(ii) continuously conveying said mixture through a pipe while extracting protein from the oil seed meal to form an aqueous protein solution having a protein content of about 5 to about 40 g/L for a period of time up to about 10 minutes.

22. The process of claim 21 wherein said salt solution has an ionic strength of about 0.15 to about 0.8.

23. The process of claim 21 wherein the salt solution has a pH of about 5.3 to about 6.2.

24. The process of claim 21 wherein the concentration of oil seed meal in said aqueous salt solution in said mixing step is about 5 to about 15% w/v.

25. The process of claim 21 wherein said temperature is at least 35° C.

26. The process of claim 21 wherein said aqueous protein solution has a protein content of about 10 to about 30 g/L.

27. The process of claim 20 wherein said concentrated protein solution is continuously mixed with said chilled water to provide a dilution of the concentrated protein solution by about 15 fold or less.

28. The process of claim 27 wherein said chilled water has a temperature of less than 10° C.

29. The process of claim 28 wherein said dilution is by about 10 fold or less.

30. A process of preparing a canola protein isolate, which comprises:
(a) crushing oil seeds to form canola oil and canola oil seed meal therefrom,
(b) solvent extracting the canola oil seed meal to recover residual canola oil therefrom, (c) removing solvent from the extracted canola oil seed meal at a temperature of below 50° C. to provide a desolventized canola oil seed meal, (d) extracting the desolventized canola oil seed meal to cause solubilization of protein in said desolventized canola oil seed meal, (e) separating the aqueous protein solution from residual canola oil seed meal (f) subjecting the aqueous protein solution to a pigment removal step, (g) increasing the protein concentration of said aqueous protein solution while maintaining the ionic strength substantially constant by using a selective membrane technique to provide a concentrated protein solution, (h) diluting said concentrated protein solution into chilled water having a temperature of below 15° C. to cause the formation of discrete protein particles in the aqueous phase in the form of micelles, (i) settling the protein micelles to form an amorphous, sticky, gelatinous, gluten-like protein micellar mass, and (j) recovering the protein micellar mass from supernatant, the protein micellar mass having a protein content of at least 90 wt % (N×6.25) on a dry weight basis.

31. The process of claim 30 wherein said pigment removal step is effected by diafiltration of the aqueous protein solution.

32. The process of claim 30 wherein said pigment removal step is effected by mixing a pigment adsorbing agent with the aqueous protein solution and subsequently removing the pigment adsorbing agent from the aqueous protein solution.

33. The process of claim 32 wherein the pigment adsorbing agent is powdered activated carbon.

34. A process of preparing a protein isolate, which comprises:

(a) crushing oil seeds to form oil and oil seed meal therefrom, (b) solvent extracting the oil seed meal to recover residual oil therefrom, (c) removing solvent from the extracted oil seed meal at a temperature of below 50° C. to provide a desolventized oil seed meal, (d) extracting the desolventized oil seed meal with water to cause solubilization of protein in said desolventized meal and subsequent thereto adding salt to the resulting aqueous protein solution to provide an aqueous protein solution having an ionic strength of at least 0.10 and a pH of about 5 to about 6.8, (e) separating the aqueous protein solution from residual oil seed meal, (f) increasing the protein concentration of said aqueous protein solution while maintaining the ionic strength substantially constant by using a selective membrane technique to provide a concentrated protein solution, (g) diluting said concentrated protein solution into chilled water having a temperature of below 15° C. to cause the formation of discrete protein particles in the aqueous phase in the form of micelles, (h) settling the protein micelles to form an amorphous, sticky, gelatinous, gluten-like protein micellar mass, and (i) recovering the protein micellar mass from supernatant, the protein micellar mass having a protein content of at least 90 wt % (N×6.25) on a dry weight basis.

35. A process of preparing a protein isolate, which comprises:

(a) crushing oil seeds to form oil and oil seed meal therefrom, (b) solvent extracting the oil seed meal to recover residual oil therefrom, (c) removing solvent from the extracted oil seed meal at a temperature of below 50° C. to provide a desolventized oil seed meal, (d) extracting the desolventized oil seed meal to cause solubilization of protein in said desolventized oil seed meal and to form an aqueous protein solution having a pH of about 5 to about 6.8, (e) separating the aqueous protein solution from residual oil seed meal, (f) increasing the protein concentration of said aqueous protein solution while maintaining the ionic strength substantially constant by ultrafiltration to produce a concentrated protein solution having a protein content of at least 200 g/L, (g) diluting said concentrated protein solution into chilled water having a temperature of below 15° C. to cause the formation of discrete protein particles in the aqueous phase in the form of micelles, (h) settling the protein micelles to form an amorphous, sticky, gelatinous, gluten-like protein micellar mass, and (i) recovering the protein micellar mass from supernatant, the protein micellar mass having a protein content of at least 90 wt % (N×6.25) on a dry weight basis.

36. The process of claim 35 wherein said concentration step is effected to produce a concentrated protein solution having a protein content of at least 250 g/L.

37. The process of claim 35 wherein said concentrated protein solution is warmed to a temperature of at least 20° C. to decrease the viscosity of the concentrated protein solution but not beyond a temperature above which the temperature of the concentrated protein solution does not permit micelle formation.

38. The process of claim 37 wherein said concentrated protein solution is warmed to a temperature of about 25° C. to about 40° C.

39. A process of preparing a protein isolate, which comprises:

(a) crushing oil seeds to form oil and oil seed meal therefrom, (b) solvent extracting the oil seed meal to recover residual oil therefrom, (c) removing solvent from the extracted oil seed meal at a temperature of below 50° C. to provide a desolventized oil seed meal, (d) extracting the desolventized oil seed meal to cause solubilization of protein in said desolventized oil seed meal and to form an aqueous protein solution having a pH of about 5 to about 6.8, (e) separating the aqueous protein solution from residual oil seed meal, (f) increasing the protein concentration of said aqueous protein solution while maintaining the ionic strength substantially constant by using a selective membrane technique to provide a concentrated protein solution, (g) diluting said concentrated protein solution by adding the concentrated protein solution into a body of water having a temperature of less than 10° C. and having the volume required to achieve dilution by about 10 fold or less, (h) settling the protein micelles to form an amorphous, sticky, gelatinous, gluten-like protein micellar mass, and (i) recovering the protein micellar mass from supernatant, the protein micellar mass having a protein content of at least 90 wt % (N×6.25) on a dry weight basis, wherein said, steps (d) to (i) are effected in a batch mode of operation.

40. A process of preparing a canola protein isolate, which comprises:

(a) crushing canola oil seeds to form canola oil seed meal therefrom, (b) solvent extracting the canola oil seed meal to recover residual canola oil therefrom, (c) removing solvent from the extracted canola oil seed meal at a temperature below 50° C. to provide a desolventized oil seed meal, (d) extracting the desolventized canola oil seed meal to cause solubilization of canola protein in said desolventized canola oil seed meal and to form an aqueous protein solution having a pH of about 5 to about 6.8, (e) separating the aqueous protein solution from residual canola oil seed meal, (f) increasing the protein concentration of said aqueous protein solution while maintaining the ionic strength substantially constant by using a selective membrane technique to provide a concentrated protein solution, (g) diluting said concentrated protein solution into chilled water having a temperature of below about 15° C. to cause the formation of discrete protein particles in the aqueous phase in the form of micelles, (h) settling the protein micelles to form an amorphous, sticky, gelatinous, gluten-like protein micellar mass, and (i) recovering the protein micellar mass from supernatant, the protein micellar mass having a protein content of at least 90 wt % (N×6.25) on a dry weight basis, and (j) processing the supernatant, on a batch, semi-continuous or continuous basis, to recover additional quantities of canola protein isolate therefrom.

41. The process of claim 40 wherein said additional quantities of protein isolate are recovered from the supernatant by concentrating the supernatant a protein concentration of about 100 to about 400 g/L, and drying the concentrated supernatant.

42. The process of claim 41 wherein the supernatant is concentrated to a protein concentration of about 200 to about 300 g/L.

43. The process of claim 40 wherein said additional quantities of protein isolate are recovered from the supernatant by concentrating the supernatant to a protein concentration of about 100 to about 400 g/L, mixing the concentrated supernatant with the recovered protein micellar mass, and drying the mixture.

44. The process of claim 43 wherein the supernatant is concentrated to be a protein concentrated of about 200 to about 300 g/L.

45. The process of claim 40 wherein said additional quantities of protein isolate are recovered from the supernatant by concentrating the supernatant to a protein concentration of about 100 to about 400 g/L, mixing a portion of said concentrated supernatant with at least a portion of the recovered protein micellar mass, and drying the resulting mixture.

46. The process of claim 45 wherein the remainder of the concentrated supernatant is dried and any remainder of the recovered protein micellar mass is dried.

47. The process of claim 45 wherein the supernatant is concentrated to a protein concentration of about 200 to about 300 g/L.

48. A process of preparing a protein isolate, which comprises:

(a) crushing oil seeds to form oil and oil seed meal therefrom, (b) solvent extracting the oil seed meal to recover residual oil therefrom, (c) removing solvent from the extracted oil seed meal at a temperature of below 50° C. to provide a desolventized oil seed meal, (d) extracting the desolventized oil seed meal to cause solubilization of protein in said desolventized oil seed meal and to form an aqueous protein solution having a pH of about 5 to about 6.8, (e) separating the aqueous protein solution from residual oil seed meal, (f) increasing the protein concentration of said aqueous protein solution while maintaining the ionic strength substantially constant by using a selective membrane technique to provide a concentrated protein solution, (g) dialyzing the concentrated protein solution to reduce the salt content thereof and to cause the formation of protein micelles, and (h) recovering a protein isolate from the dialyzed concentrated protein solution having a protein content of at least 100 wt % (N×6.25) on a dry weight basis.

49. The process of claim 48 wherein said protein isolate recovery is effected by drying the dialyzed concentrated protein solution.

50. A process of preparing a protein isolate, which comprises:

(a) crushing oil seeds to form oil and oil seed meal therefrom, (b) solvent extracting the oil seed meal to recover residual oil therefrom, (c) removing solvent from the extracted oil seed meal by air-desolventizing at a temperature of about 15° C. to about 25° C. to provide a desolventized oil seed meal, (d) extracting the desolventized oil seed meal to cause solubilization of protein in said desolventized oil seed meal and to form an aqueous protein solution having a pH of about 5 to about 6.8, (e) separating the aqueous protein solution from residual oil seed meal, (f) increasing the protein concentration of said aqueous protein solution while maintaining the ionic strength substantially constant by using a selective membrane technique to provide a concentrated protein solution, (g) diluting said concentrated protein solution into chilled water having a temperature of below about 15° C. to cause the formation of discrete protein particles in the aqueous phase in the form of micelles, (h) settling the protein micelles to form an amorphous, sticky, gelatinous, gluten-like protein micellar mass, and (i) recovering the protein micellar mass from supernatant, the protein micellar mass having a protein content of at least 90 wt % (N×6.25) on a dry weight basis.

51. A process of preparing a protein isolate, which comprises:

(a) crushing oil seeds to form oil and oil seed meal therefrom, (b) solvent extracting the oil seed meal to recover residual oil therefrom, (c) removing solvent from the extracted oil seed meal under vacuum at a temperature of below about 50° C. to provide a desolventized oil seed meal, (d) extracting the desolventized oil seed meal to cause solubilization of protein in said desolventized oil seed meal and to form an aqueous protein solution having a pH of about 5 to about 6.8, (e) separating the aqueous protein solution from residual oil seed meal, (f) increasing the protein concentration of said aqueous protein solution while maintaining the ionic strength substantially constant by using a selective membrane technique to provide a concentrated protein solution, (g) diluting said concentrated protein solution into chilled water having a temperature of below about 15° C. to cause the formation of discrete protein particles in the aqueous phase in the form of micelles, (h) settling the protein micelles to form an amorphous, sticky, gelatinous, gluten-like protein micellar mass, and (i) recovering the protein micellar mass from supernatant, the protein micellar mass having a protein content of at least 90 wt % (N×6.25) on a dry weight basis.

\* \* \* \* \*